United States Patent
Kang

(10) Patent No.: US 11,524,533 B2
(45) Date of Patent: Dec. 13, 2022

(54) APPARATUS AND METHOD FOR ESTIMATING TIRE RESONANCE FREQUENCY

(71) Applicants: HYUNDAI MOTOR COMPANY, Seoul (KR); KIA MOTORS CORPORATION, Seoul (KR)

(72) Inventor: Ju-Yong Kang, Hanam-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 669 days.

(21) Appl. No.: 16/600,681

(22) Filed: Oct. 14, 2019

(65) Prior Publication Data
US 2020/0139770 A1    May 7, 2020

(30) Foreign Application Priority Data
Nov. 6, 2018  (KR) .................. 10-2018-0135481

(51) Int. Cl.
*B60C 23/04*  (2006.01)
*G01M 17/02* (2006.01)
(Continued)

(52) U.S. Cl.
CPC .......... *B60C 23/04* (2013.01); *B60C 23/062* (2013.01); *G01M 17/02* (2013.01); *G07C 5/02* (2013.01); *G07C 5/08* (2013.01); *G01P 3/481* (2013.01)

(58) Field of Classification Search
CPC ........... B60C 23/0408; B60C 23/0496; B60C 23/061; B60C 23/0494; B60C 23/0416; B60C 23/0433; B60C 23/0493; B60C 19/00; B60C 23/04; B60C 23/041; B60C 23/0411; B60C 23/0462; B60C 23/20; B60C 23/0444; B60C 11/24; B60C 23/0479; B60C 23/064; B60C 23/007; B60C 23/062; B60C 23/0401; B60C 23/0413; B60C 23/0488; B60C 23/06; B60C 23/043; B60C 23/0452; B60C 23/0467; B60C 11/246; B60C 23/0498; B60C 23/02; B60C 99/006; B60C 23/0428; B60C 23/0442; B60C 23/009;
(Continued)

(56) References Cited

U.S. PATENT DOCUMENTS 7,158,866 B2 *  1/2007  Gustafsson ........... B60C 23/061
                                                      701/1
7,240,542 B2     7/2007  Gustafsson et al.
(Continued)

FOREIGN PATENT DOCUMENTS

EP    1086834 A2 *  3/2001 ........... B60C 23/061
FR    2573206 A1 *  5/1986
(Continued)

*Primary Examiner* — Andre J Allen
(74) *Attorney, Agent, or Firm* — Fox Rothschild LLP

(57) ABSTRACT

An apparatus for estimating a tire resonance frequency may include a sensor for detecting rotation of a tone wheel; and a signal processor for calculating the detected rotation to produce a corrected wheel speed, filtering the corrected wheel speed in a predetermined manner to produce a filtered wheel speed from which engine noise is removed, and estimating a resonance frequency of a tire using the filtered wheel speed.

20 Claims, 15 Drawing Sheets

(51) Int. Cl.
*G07C 5/02* (2006.01)
*G07C 5/08* (2006.01)
*B60C 23/06* (2006.01)
*G01P 3/481* (2006.01)

(58) Field of Classification Search
CPC ......... B60C 2019/004; B60C 23/0425; B60C 11/243; B60C 23/004; B60C 23/00354; B60C 23/045; B60C 23/0464; B60C 23/003; B60C 23/00318; B60C 23/0472; B60C 23/066; B60C 23/00372; B60C 23/0403; B60C 23/04985; B60C 23/0406; B60C 29/02; B60C 11/00; B60C 23/006; B60C 23/00; B60C 23/044; B60C 23/008; B60C 23/0455; B60C 23/0454; B60C 23/0483; B60C 23/0461; B60C 23/0474; B60C 23/0415; B60C 23/0491; B60C 23/0489; B60C 25/002; B60C 29/064; B60C 23/00363; B60C 11/0318; B60C 23/0459; B60C 23/0471; B60C 23/0481; B60C 2019/005; B60C 23/002; B60C 23/042; B60C 2200/02; B60C 23/0422; B60C 23/0423; B60C 23/0466; B60C 23/0405; B60C 23/0477; B60C 29/06; B60C 13/001; B60C 23/0437; B60C 23/0476; B60C 25/132; B60C 23/0447; B60C 23/0427; B60C 23/0449; B60C 25/00; B60C 9/18; B60C 13/00; B60C 19/003; B60C 23/0484; B60C 23/065; B60C 23/00336; B60C 23/0486; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0457; B60C 23/12; B60C 25/18; B60C 11/13; B60C 23/0418; B60C 23/0469; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/127; B60C 23/16; B60C 29/068; B60C 3/04; B60C 9/20; B60C 11/01; B60C 11/0302; B60C 13/02; B60C 23/126; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 23/131; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22; G01M 17/02; G01M 17/022; G01M 17/027; G01M 17/021; G01M 17/024; G01M 17/025; G01M 17/013; G01M 17/007; G01M 1/045; G01M 17/06; G01M 1/02; G01M 1/326; G01M 1/30; G01M 5/0058; G01M 1/26; G01M 17/0074; G01M 1/225; G01M 17/04; G01M 17/065; G01M 17/0072; G01M 17/10; G01M 7/00; G01M 1/16; G01M 99/00; G01M 7/08; G01M 1/34; G01M 17/028; G01M 17/045; G01M 3/3218; G01M 1/04; G01M 3/40; G01M 17/08; G01M 5/0091; G01M 1/365; G01M 13/04; G01M 17/03; G01M 5/0066; G01M 1/08; G01M 1/22; G01M 13/027; G01M 5/0033; G01M 1/00; G01M 1/122; G01M 15/044; G01M 3/24; G01M 3/2876; G01M 5/0075; G01M 1/06; G01M 1/12; G01M 1/24; G01M 1/32; G01M 1/36; G01M 11/081; G01M 13/023; G01M 13/025; G01M 17/00; G01M 17/0076; G01M 3/022; G01M 3/042; G01M 3/045; G01M 3/147; G01M 3/227; G01M 3/3236; G01M 5/0016; G01M 5/0025; G01M 5/0083; G01M 7/022; G01M 7/025; G01M 7/04; G01M 7/06; G01M 9/02; G01M 9/04; G01M 99/002; G01M 99/004; G01M 3/002; G01M 3/04; G01M 7/02; G01M 9/06
USPC .................................................. 73/146–146.8
See application file for complete search history.

(56) References Cited

U.S. PATENT DOCUMENTS

| | | | | |
|---|---|---|---|---|
| 10,347,236 | B1* | 7/2019 | Bastyr | G10K 11/17823 |
| 10,414,218 | B2* | 9/2019 | Shin | B60C 23/061 |
| 2016/0131547 | A1* | 5/2016 | Yanase | B60C 23/061 |
| | | | | 702/50 |

FOREIGN PATENT DOCUMENTS

| | | |
|---|---|---|
| JP | H8-002222 A | 1/1996 |
| JP | 2014-055923 A | 3/2014 |
| JP | 2014-074607 A | 4/2014 |
| JP | 6063428 B | 1/2017 |
| KR | 10-2010-0005848 A | 1/2010 |
| KR | 10-2010-0097993 A | 6/2010 |
| WO | WO-03045718 A1 * 6/2003 ......... B60G 17/0182 |

* cited by examiner

APPARATUS AND METHOD FOR ESTIMATING TIRE RESONANCE FREQUENCY

CROSS-REFERENCE TO RELATED APPLICATION

The present application claims priority to and the benefit of Korean Patent Application No. 10-2018-0135481 filed on Nov. 6, 2018, which is incorporated herein by reference in its entirety.

FIELD

The present disclosure relates to a technique for estimating a tire resonance frequency; and, particularly, to an apparatus and method for estimating a tire resonance frequency, capable of detecting a low-pressure state of a tire regardless of engine noise.

BACKGROUND

The statements in this section merely provide background information related to the present disclosure and may not constitute prior art.

It is generally determined whether a tire is in an insufficient pneumatic state by detecting a change in the radius of rotation and stiffness of the tire. More specifically, it is determined whether the tire is under low pressure by calculating a change in the radius of rotation and stiffness of the tire relative to the normal pressure thereof using a wheel speed sensor.

However, such a method lacks a technique for removing noise during engine explosion. That is, noise intervenes in an engine frequency. Hence, within a certain revolution per minute (RPM), the resonance frequency of the tire may be estimated in proportion to an engine RPM regardless of the air pressure of the tire.

Within the same tire pressure and a certain RPM (about 1700 RPM), the estimated frequency value also increases in proportion to the RPM. Hence, it is impossible to determine whether the tire is under low pressure through resonance frequency estimation within a certain RPM.

SUMMARY

One form of the present disclosure is directed to an apparatus and method for estimating a tire resonance frequency, capable of detecting a low-pressure state of a tire regardless of engine noise.

Another form of the present disclosure is directed to an apparatus and method for estimating a tire resonance frequency, capable of estimating a resonance frequency of a tire even in a low-speed region.

Other objects and advantages of the present disclosure can be understood by the following description, and become apparent with reference to the forms of the present disclosure. Also, it is obvious to those skilled in the art to which the present disclosure pertains that the objects and advantages of the present disclosure can be realized by the means as claimed and combinations thereof.

In some forms of the present disclosure, there is provided an apparatus for estimating a tire resonance frequency, capable of detecting a low-pressure state of a tire regardless of engine noise.

The apparatus includes a sensor for detecting rotation of a tone wheel, and a signal processor for calculating the detected rotation to produce a corrected wheel speed, filtering the corrected wheel speed in a predetermined manner to produce a filtered wheel speed from which engine noise is removed, and estimating a resonance frequency of a tire using the filtered wheel speed.

The filtering the corrected wheel speed may be performed using a notch filter designed using an engine frequency calculated from an engine revolution per minute (RPM).

The filtering the corrected wheel speed may be performed by respectively applying different predetermined weighted values to a band-pass filter, which is set in advance, and the notch filter.

The band-pass filter may have a predetermined radial vibration range of the tire.

The apparatus may further include a gyro sensor for measuring a longitudinal acceleration, a lateral acceleration, and a yaw rate of a vehicle, in addition to the sensor.

When the longitudinal acceleration or the lateral acceleration measured by the gyro sensor is larger than a predetermined first set value or the yaw rate measured by the gyro sensor is larger than a predetermined second set value, an operation of estimating the resonance frequency of the tire may not be executed.

When the signal processor receives position control information related to operating body position control of a vehicle, an operation of estimating the resonance frequency of the tire may not be executed.

When a speed of a vehicle is smaller than a predetermined third set value or larger than a predetermined fourth set value, the signal processor may not perform an operation of estimating the resonance frequency of the tire.

The corrected wheel speed may be produced by correcting a tone wheel angle and a tone wheel error angle and applying an average tone wheel error caused using an average filter for each pulse counter of each tone wheel.

The resonance frequency of the tire may be calculated by performing discretization and simplification using an autoregressive model.

In another form of the present disclosure, there is provided a method for estimating a tire resonance frequency, which includes detecting rotation of a tone wheel by a sensor, calculating the detected rotation to produce a corrected wheel speed and filtering the corrected wheel speed in a predetermined manner to produce a filtered wheel speed from which engine noise is removed by a signal processor, and estimating a resonance frequency of a tire using the filtered wheel speed by the signal processor.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
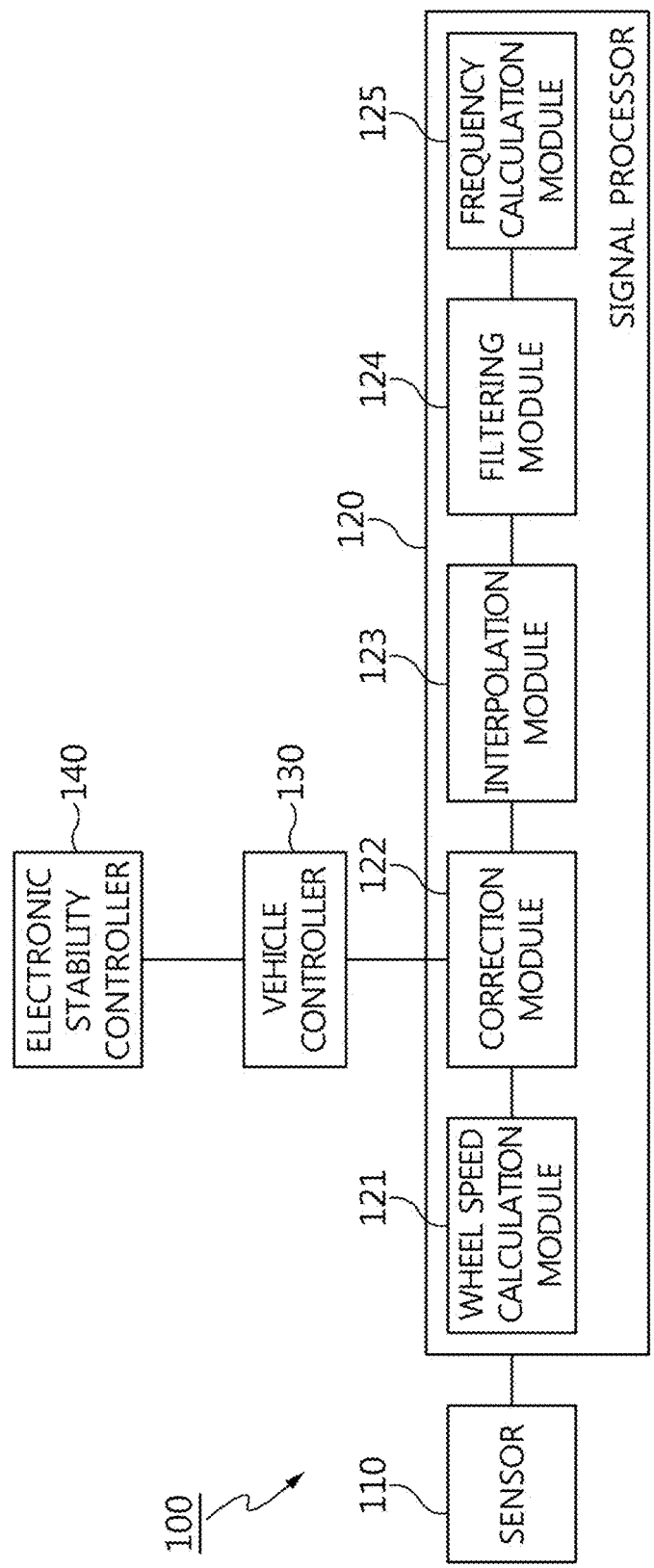
FIG. 1 is a block diagram of an apparatus for estimating a tire resonance frequency in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

For example, without deviating from the scope and spirit of the present disclosure, a first element may be referred to as a second element, and, similarly, a second element may also be referred to as a first element. As used herein, the term "and/or" includes any and all combinations of one or more of the associated listed items.

Unless otherwise defined, all terms, including technical and scientific terms, used herein have the same meaning as commonly understood by one of ordinary skill in the art.

It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, an apparatus and method for estimating a tire resonance frequency in some forms of the present disclosure will be described in detail with reference to the accompanying drawings.

FIG. 1 is a block diagram of an apparatus for estimating a tire resonance frequency in some forms of the present disclosure. Referring to FIG. 1, the apparatus for estimating a tire resonance frequency may include a sensor 110 for detecting the rotation of a wheel, a signal processor 120 for producing a wheel speed according to the rotation detection of the wheel and estimating a tire resonance frequency by, for example, correcting and filtering the wheel speed to remove engine noise, a vehicle controller 130 for transmitting engine information, a vehicle signal, or the like to the signal processor 120, and so on.

In addition to the sensor 110, the apparatus may include a wheel speed sensor, a gyro sensor, and so on. The wheel speed sensor may be a wheel pulse counter. The gyro sensor measures the longitudinal/lateral acceleration and yaw rate of a vehicle. Therefore, the calculation of the tire resonance frequency is processed as an exception during turning or rapid acceleration/deceleration.

The signal processor 120 may include a wheel speed calculation module 121 for calculating the detected rotation of the wheel to produce a calculated wheel speed, a correction module 122 for correcting the calculated wheel speed to produce a corrected wheel speed, an interpolation module 123 for interpolating the corrected wheel speed to produce an interpolated wheel speed corresponding to the wheel speed at a certain sampling time Ts, a filtering module 124 for filtering the interpolated wheel speed in a predetermined manner to produce an engine noise-removed filtered wheel speed, a frequency calculation module 125 for estimating a tire resonance frequency using the filtered wheel speed, and so on.

The vehicle controller 130 functions to control the signal processor 120 and components for control of the vehicle. Especially, the vehicle controller 130 may be connected to an engine control unit (ECU) (not shown), which controls an engine (not shown), to acquire engine information. Examples of the engine information may include an engine revolution per minute (RPM), engine starting, and idling.

In addition, the vehicle controller 130 may be connected to an electronic stability controller (ESC) 140. The electronic stability controller 140 functions to control the body position of the vehicle. To this end, the electronic stability controller 140 is connected to an antilock brake system (ABS), a traction control system (TCS), a vehicle dynamic control system (VDC), and the like to control the position of the vehicle. Therefore, the vehicle controller 130 may receive an ESC operation flag signal, which is position control information for operating the body position control of the vehicle, from the electronic stability controller 140.

The vehicle controller 130 and the electronic stability controller 140 may include, for example, a microprocessor, a memory, and an electronic circuit to perform the control.

The term "module" described in FIG. 1 means a unit for processing at least one function or operation, which may be implemented by a combination of hardware and/or software. For hardware implementation, the processing unit may be implemented with application specific integrated circuits (ASICs), digital signal processors (DSPs), programmable logic devices (PLDs), field programmable gate arrays (FPGAs), processors, controllers, microprocessors, other electronic units, or a combination thereof, which are designed to perform the functions described above. For software implementation, the processing unit may be implemented with modules that perform the functions described above. The software may be stored in memory units and executed by processors. The memory units or the processors may adopt various means well known to those skilled in the art.

Figure 2:
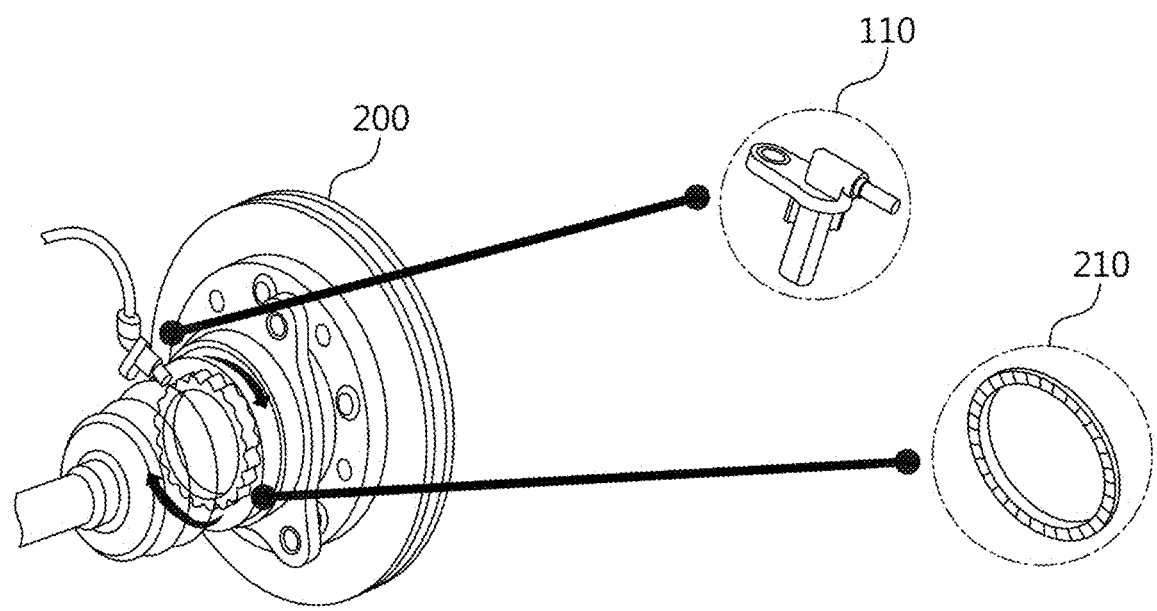
FIG. 2 is a conceptual view of installation of the sensor illustrated in FIG. 1.
Figure 5:
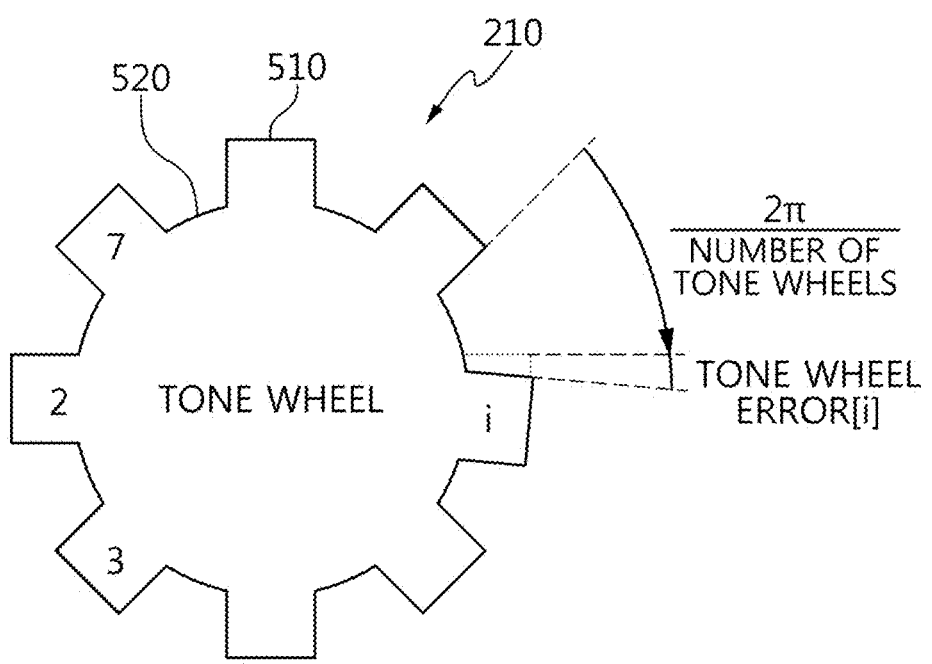
FIG. 5 is a conceptual view illustrating the general principle of generation of a tone wheel error.

FIG. 2 is a conceptual view of installation of the sensor illustrated in FIG. 1. Referring to FIG. 2, the sensor 110 is installed to detect the rotation of a tone wheel 210 installed inside a vehicle wheel 200. As the vehicle wheel 200 rotates, the tone wheel 210 rotates correspondingly so that the sensor 110 detects such rotation in real time. The sensor 110 may be a wheel speed sensor, especially a magnetoresistive (MR) sensor. Typically, the tone wheel 210 has a disk shape and in the form of a gear having teeth formed on the edge thereof. This is illustrated in FIG. 5 and will be described later.

Figure 3:
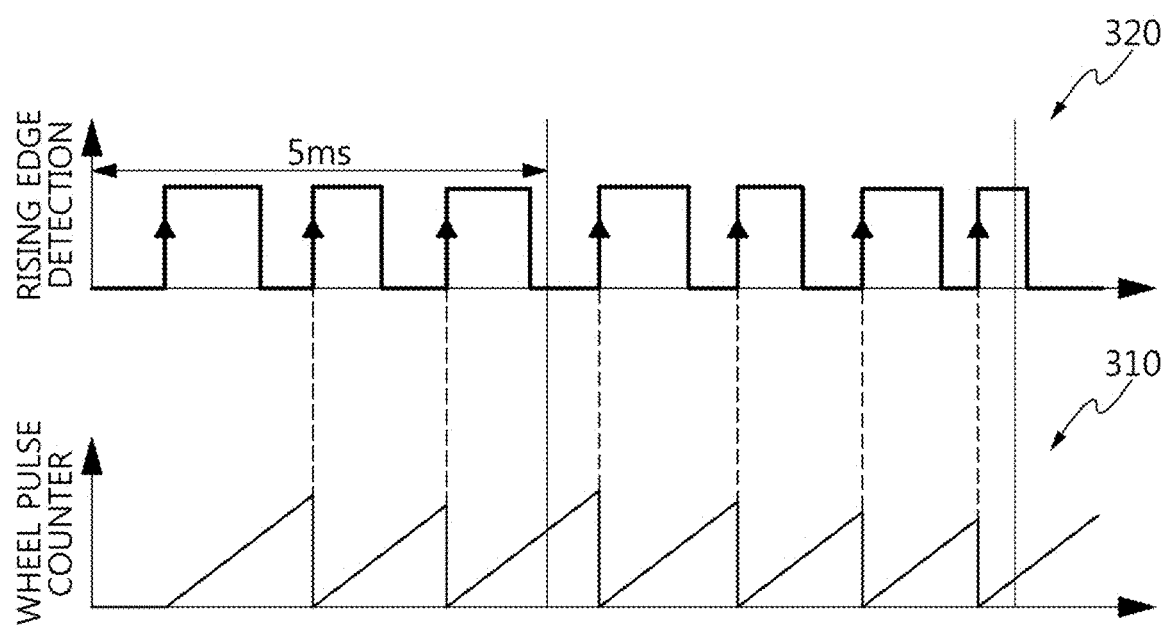
FIG. 3 is a pulse diagram of an output signal of the sensor illustrated in FIG. 1.

FIG. 3 is a pulse diagram of an output signal of the sensor 110 illustrated in FIG. 1. Referring to FIG. 3, a wheel pulse counter operation 310 is the same as a generated time operation between rising edges 320. That is, the number of rising edges generated within a logic sampling period (about 5 ms) is measured to count wheel pulses. Therefore, the wheel speed using the wheel pulse counter is expressed by the following equation:

$$\text{wheel speed} = \frac{2\pi}{\text{number of tone wheels}} \times \frac{MCU \text{ clock cycle}}{\text{wheel pulse counter}} \quad \text{[Equation 1]}$$

where micro control unit (MCU) clock cycle = 1.0 MHz.

Figure 4:
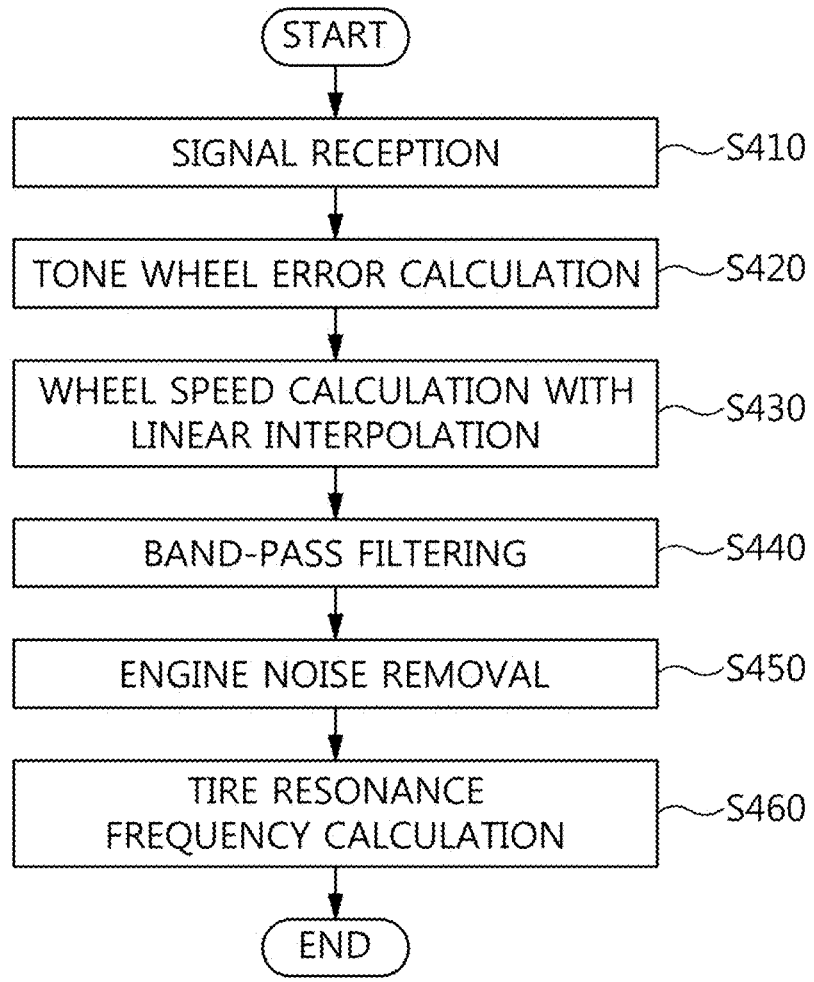
FIG. 4 is a flowchart illustrating a process for estimating a tire resonance frequency in one form of the present disclosure.

FIG. 4 is a flowchart illustrating a process for estimating a tire resonance frequency in some forms of the present disclosure. Referring to FIG. 4, as a sensor 110 detects the rotation of a vehicle wheel 200 (see FIG. 2), a signal is generated and transmitted to a signal processor 120. When the signal is transmitted to the signal processor 120, the signal processor 120 calculates that signal to produce a calculated wheel speed (S410).

Then, since the tone wheel angle has an error due to manufacturing dispersion, the signal processor 120 calculates and corrects the error to produce a corrected wheel speed (S420). That is, by correcting the error in the tone wheel angle, the wheel speed is calculated by the pulse counter of each tone wheel. In more detail, the wheel speed is calculated and corrected whenever a pulse counter is input. This may be defined as occurring in an event domain.

Then, the signal processor 120 linearly interpolates the corrected wheel speed to produce an interpolated wheel speed (S430). That is, the wheel speed is calculated at a certain sampling time Ts. This means a change from the event domain to a time domain.

Then, the signal processor 120 applies a band-pass filter of about 30 to 60 Hz to the interpolated wheel speed to produce a filtered wheel speed (S440). The frequency of 30 to 60 Hz typically refers to a radial vibration range of the tire.

Then, the signal processor 120 applies a notch filter, which is designed using the engine frequency calculated from the engine RPM, to the filtered wheel speed to remove engine noise therefrom (S450).

Then, the signal processor 120 calculates a tire resonance frequency through model-based parameter estimation (S460).

FIG. 5 is a conceptual view illustrating the general principle of generation of the tone wheel error. Referring to FIG. 5, the tone wheel 510 has teeth 510 formed on the circumferential surface thereof and grooves 520 formed between the teeth 510. Therefore, the tone wheel angle formed between two adjacent teeth 510 is 2π/number of tone wheels. Although it is assumed that these tone wheel angles are ideally the same, an error angle is due to manufacturing dispersion. Accordingly, it is necessary to correct a tone wheel error due to the error angle. This is expressed by the following equation:

$$\text{tone wheel error}[i] = \quad \text{[Equation 2]}$$
$$\frac{\text{tone wheel angle}[i] \cdot \frac{2\pi}{\text{number of tone wheels}}}{\frac{2\pi}{\text{number of tone wheels}}} \times$$

$$\left( \frac{\text{wheel pulse counter}[i]}{\text{one-revolution average wheel pulse counter}} \cdot 1 \right)$$

where $i$ is a natural number.

Of course, it is assumed that the wheel speed is constant at one revolution. In addition, a one-revolution average wheel speed is assumed.

Figure 6A:
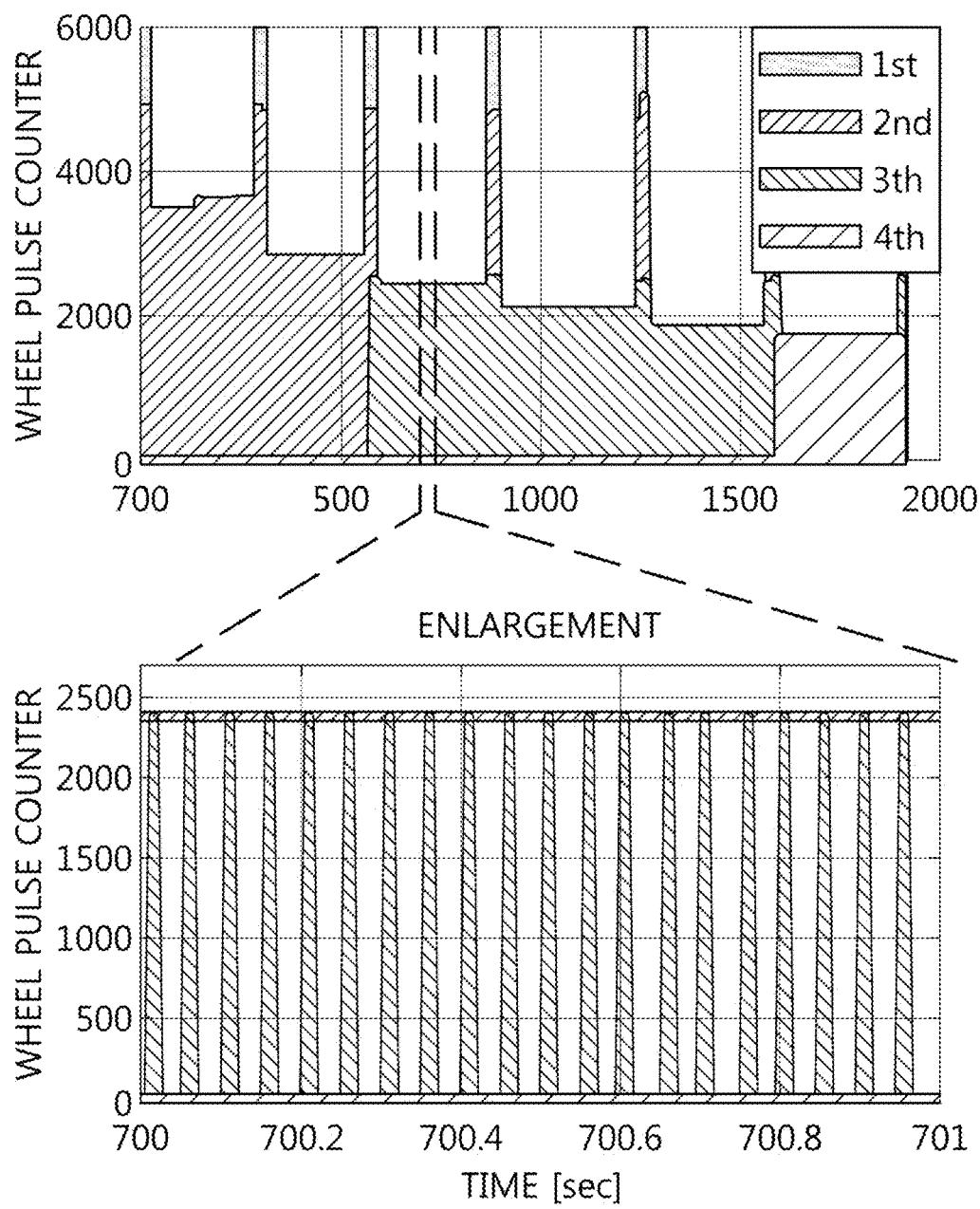
FIGS. 6A to 6C are detailed graphs of the correction operation process illustrated in FIG. 4.
Figure 6B:
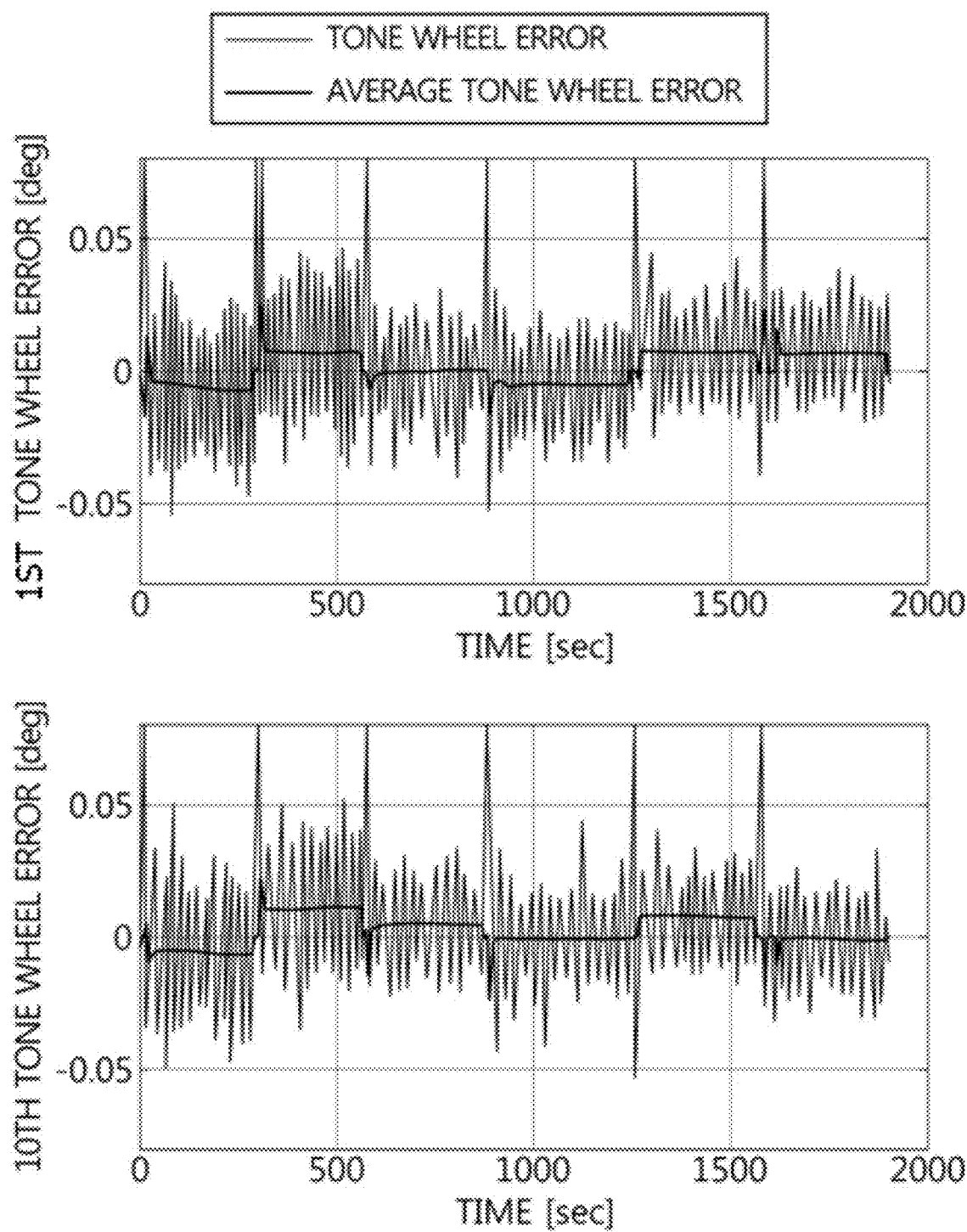
Figure 6C:
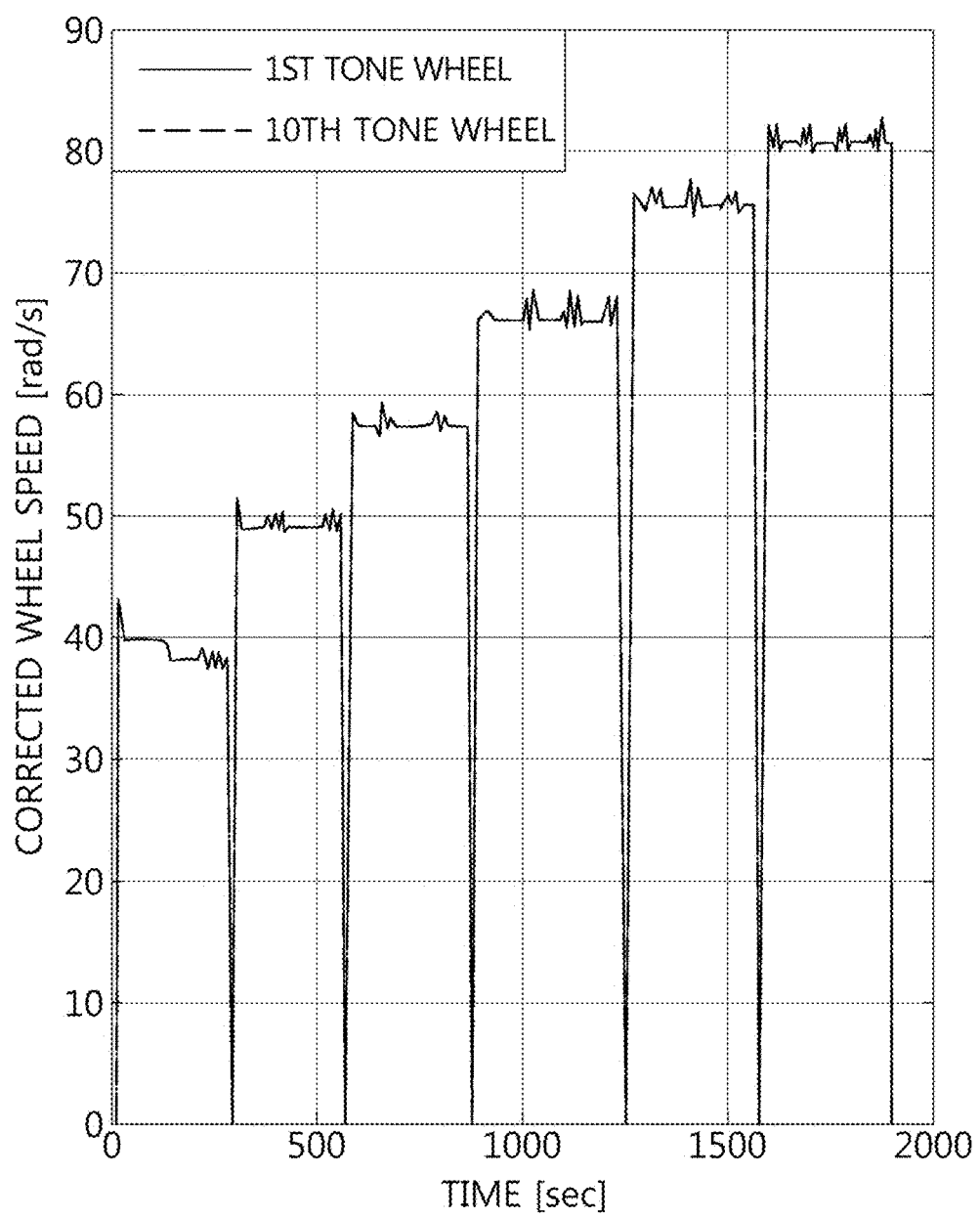

FIGS. 6A to 6C are detailed graphs of the correction operation process illustrated in FIG. 4. FIG. 6A is a graph illustrating a wheel pulse counter operation. That is, the wheel speed is calculated whenever a pulse counter is input. That is, this is an event domain.

FIG. 6B is a graph illustrating a tone wheel error operation. The operation of the average tone wheel error using the average filter is as follows:

$$\text{average tone wheel error}[i](k) = \quad \text{[Equation 3]}$$
$$\text{average tone wheel error}[i](k-1) +$$
$$\frac{\text{tone wheel error}[i] - \text{average tone wheel error}[i](k-1)}{k}$$

where $k$ is a natural number, and $k > i$.

In FIG. 6B, the term "deg" refers to a degree.

FIG. 6C is a graph illustrating a corrected wheel speed operation. That is, when the wheel speed is calculated by the pulse counter of each tone wheel through the correction of the tone wheel error angle illustrated in FIGS. 6A and 6B, the operation of the tone wheel error-corrected wheel speed for each tone wheel is performed. This is expressed by the following equation:

$$\text{corrected wheel speed}[i] = \quad \text{[Equation 4]}$$
$$\left( \frac{2\pi}{\text{number of tone wheels}} + \text{average tone wheel error}[i] \right) \times$$
$$\frac{MCU \text{ clock cycle}}{\text{wheel pulse counter}[i]}$$

where 2π/number of tone wheels refers to a tone wheel angle.

However, the operation of the corrected wheel speed is an exception if any of the following conditions is satisfied:
vehicle body position control operation; and
braking operation and gear shifting.

In FIG. 6C, "rad" refers to a radian.

Figure 7:
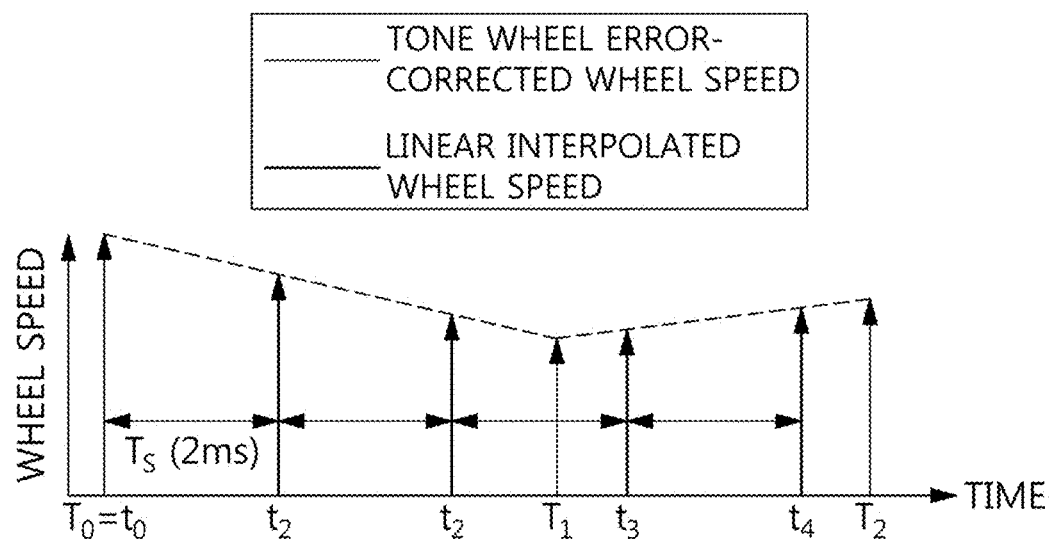
FIG. 7 is a conceptual diagram for explaining linear interpolation of producing an interpolated wheel speed in the case of the corrected wheel speed illustrated in FIG. 6C.

FIG. 7 is a conceptual diagram for explaining linear interpolation of producing an interpolated wheel speed in the case of the corrected wheel speed illustrated in FIG. 6C. Generally, in the case of a corrected wheel speed operation, the wheel speed is calculated whenever the rising edge of the tone wheel occurs. In this case, it corresponds to an event domain. Therefore, for the use of signal filtering and model-based parameter estimation techniques, there is required the wheel speed at a certain sampling time Ts.

That is, an interpolated wheel speed is produced using linear interpolation as illustrated in FIG. 7. Referring to FIG. 7, Ts is about 2 ms. That is, the tone wheel error-corrected wheel speed occurs in cycles of $T_0$, $T_1$, and $T_2$, and the interpolated wheel speed occurs in cycles of $t_0$, $t_1$, $t_2$, $t_3$, and $t_4$ with a smaller certain sampling time Ts.

Therefore, the operation of the wheel speed at a certain sampling time is performed using the following equation:

$$y(t_i) = \frac{Y(k) - Y(k-1)}{T(k) - T(k-1)} \times \{t_i - T(k-1)\} + Y(k-1) \quad \text{[Equation 5]}$$

where the initial value: $y(t_0) = Y(T_0)$, $y$ = linear interpolated wheel speed, and $Y$ = tone wheel error-corrected wheel speed.

Substituting a pulse time into the above equation is expressed by the following equation:

$$\text{pulse time} = T(k) - T(k-1) = \frac{\text{wheel pulse counter}[i]}{MCU \text{ clock cycle}} \quad \text{[Equation 6]}$$

Therefore, the operation of the interpolated wheel speed $y(t_i)$ at a certain sampling time may be summarized as the following equation:

$$y(t_i) = \frac{t_i - T(k-1)}{\text{pulse time}} \times \Delta Y + Y(k-1) = \alpha \times \Delta Y + Y(k-1) \quad \text{[Equation 7]}$$

where $t_i - T(k)$ is a remaining time, $\Delta Y$ = interpolated wheel speed$[i] - Y(k-1)$, and $\alpha = 1 + \frac{t_i - T(k)}{\text{pulse time}}$.

The parameter "$\alpha$" is defined again as the following equation:

$$\alpha = 1 + \text{remaining time} \times \frac{MCU \text{ clock cycle}}{\text{wheel pulse counter}[i]} \quad \text{[Equation 8]}$$

In addition, the time update is $t_{i+1} = t_i + Ts$ (2 ms).

Accordingly, the linear interpolation process is as follows.

If the wheel speed interpolation is activated (=true), the interpolated wheel speed $y(t_i)$ is calculated while the remaining time is less than 0 (zero). Of course, the number of interpolations increases by +1, and the remaining time increases by +2 ms.

In contrast, if the wheel speed interpolation is not activated, the wheel speed interpolation is changed to be activated and it is set as "interpolated wheel speed [0]=corrected wheel speed [i]", "number of interpolations=1", and "remaining time=2 ms". In this case, Y(k−1)=corrected wheel speed [i].

In addition, the operation of the interpolated wheel speed is processed as an exception during the calculation of the tire resonance frequency if any of the following conditions is satisfied (that is, the related variables being initialized):

‖longitudinal acceleration‖>about 0.1 g;

‖lateral acceleration‖>about 0.1 g;

‖yaw rate‖>about 3 deg/s;

vehicle speed<about 40 kph or vehicle speed>about 110 kph;

vehicle body position control operation; and braking operation and gear shifting detection.

Figure 8:
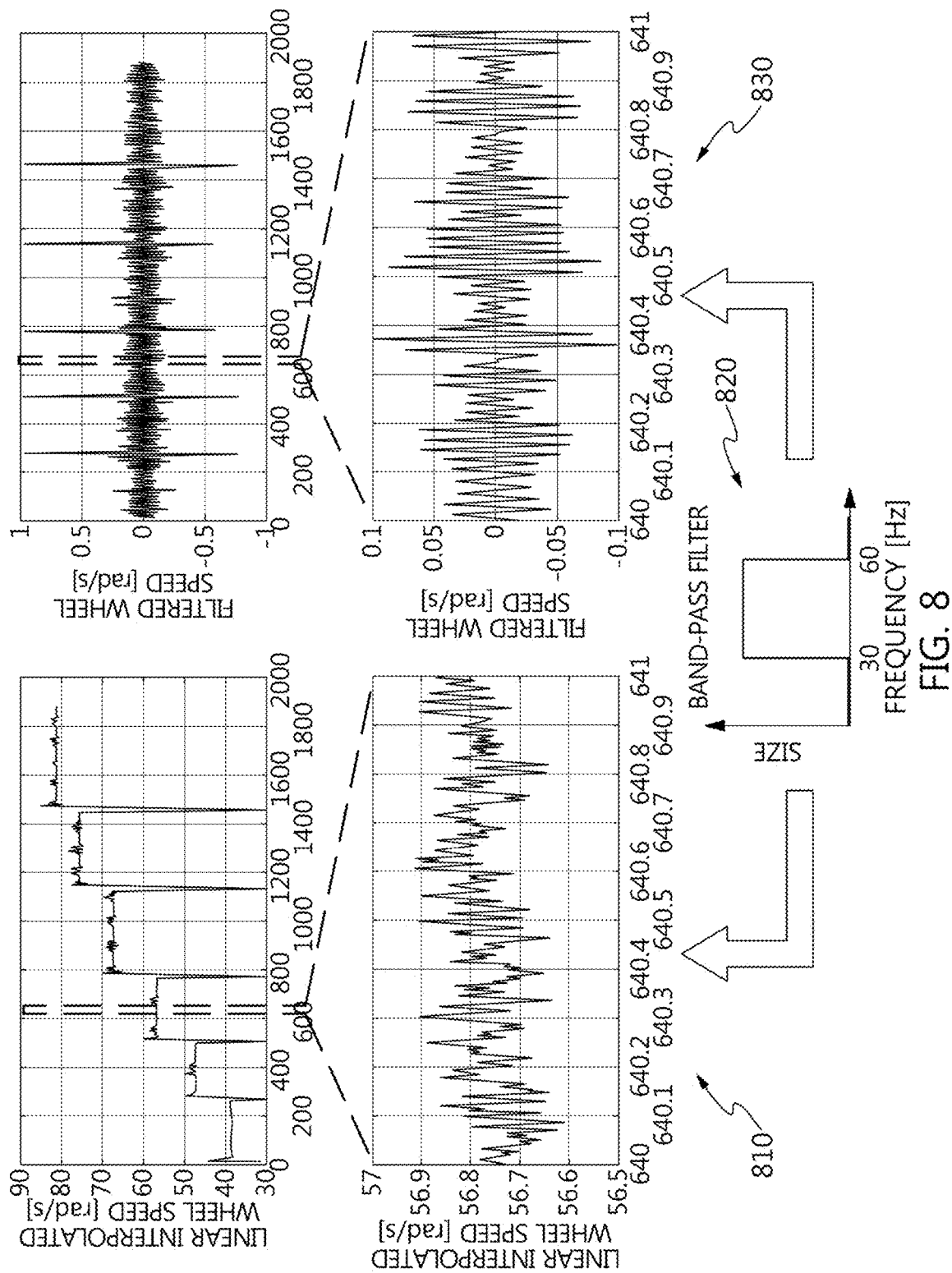
FIG. 8 is a detailed graph of the band-pass filtering process illustrated in FIG. 4.

FIG. 8 is a detailed graph of the band-pass filtering process illustrated in FIG. 4. Referring to FIG. 8, the band-pass filter of about 30 to 60 Hz is applied to the interpolated wheel speed for filtering it. When the band-pass filter 820 is applied to the interpolated wheel speed 810 for filtering it, a band-pass filtered wheel speed 830 is produced.

Figure 9:
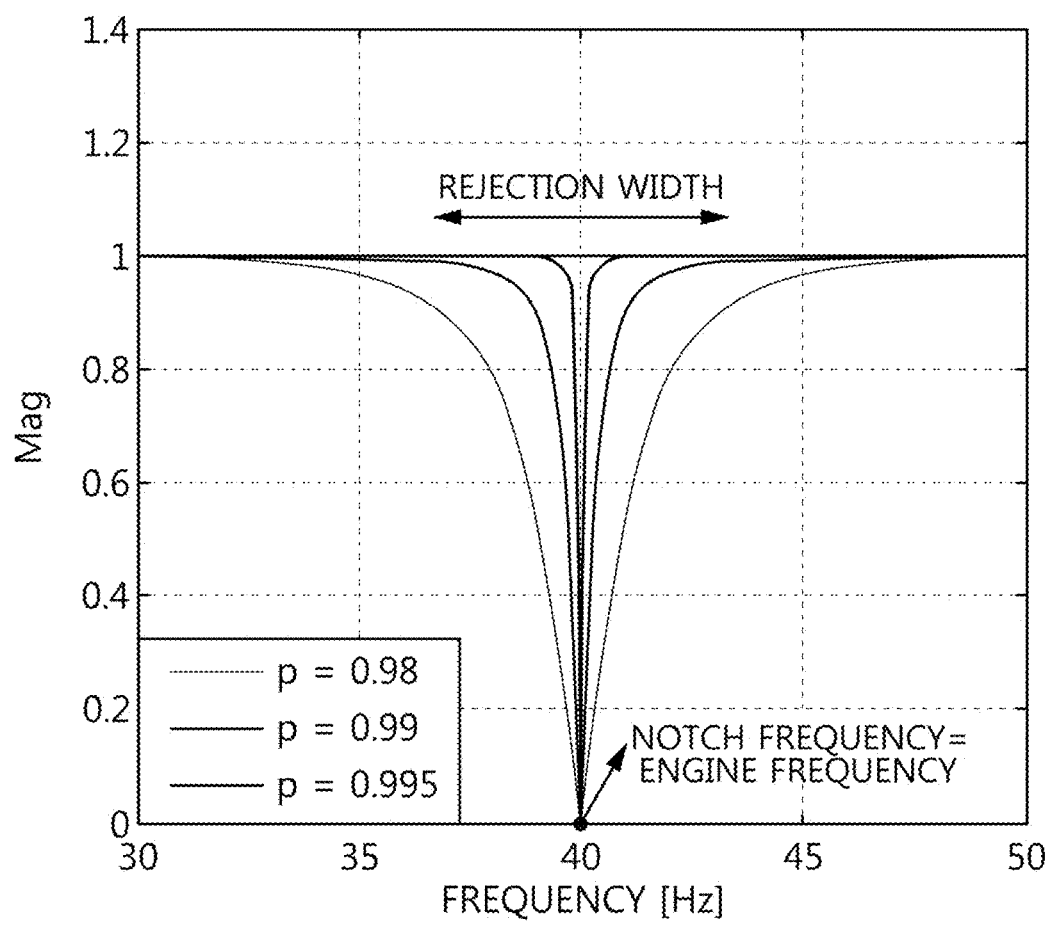
FIG. 9 is is a conceptual diagram of a notch filter for removing the engine noise illustrating in FIG. 4.

FIG. 9 is is a conceptual diagram of a notch filter for removing the engine noise illustrating in FIG. 4. Referring to FIG. 9, the 4-stoke explosion of an engine piston causes vehicle body vibration which becomes an engine frequency. That is, in the case of a 4-cylinder and 4-stroke engine, four explosions occur at two revolutions. Therefore, the engine frequency may be defined as the following equation:

$$\text{engine frequency} = \text{engine } RPM \times \frac{4 \text{ times}}{\text{two revolutions}} \times \frac{1}{60 \text{ seconds}}. \quad \text{[Equation 9]}$$

Therefore, the transfer function of the notch filter for removing the engine noise may be defined as the following equation:

$$\frac{Y(z)}{U(z)} = \frac{1 - 2 \times \cos(w_0) \times z^{-1} + z^{-2}}{1 - 2 \times p \times \cos(w_0) \times z^{-1} + p^2 \times z^{-2}} \quad \text{[Equation 10]}$$

where $U(z)$ is an input function, $Y(z)$ is an output function, $p$ = rejection width (910), $w_0 = 2\pi \times Ts \times$ engine frequency, and $z$ is a notch frequency.

In FIG. 9, notch frequency=engine frequency (920), and "mag" refers to a magnitude.

The final filtered wheel speed produced by applying the notch filter to the filtered wheel speed is defined as the following equation:

filtered wheel speed=weighted value×Band-Pass filtered wheel speed+(1−weighted value)×notch-filtered wheel speed [Equation 11]

where the weighted value may be obtained by an experiment or be an arbitrary value set by the user in advance.

Of course, the Fast Fourier Transform (FFT) analysis and order analysis may be applied to the filtered wheel speed produced by application of the band-pass filter and the notch filter. Through the FFT analysis, it can be seen that the noise in the engine frequency region may intervene in the band-pass-filtered wheel speed. In addition, when the notch filter designed based on the engine frequency is applied to the wheel speed, it can be seen that the engine noise is removed therefrom.

Figure 10:
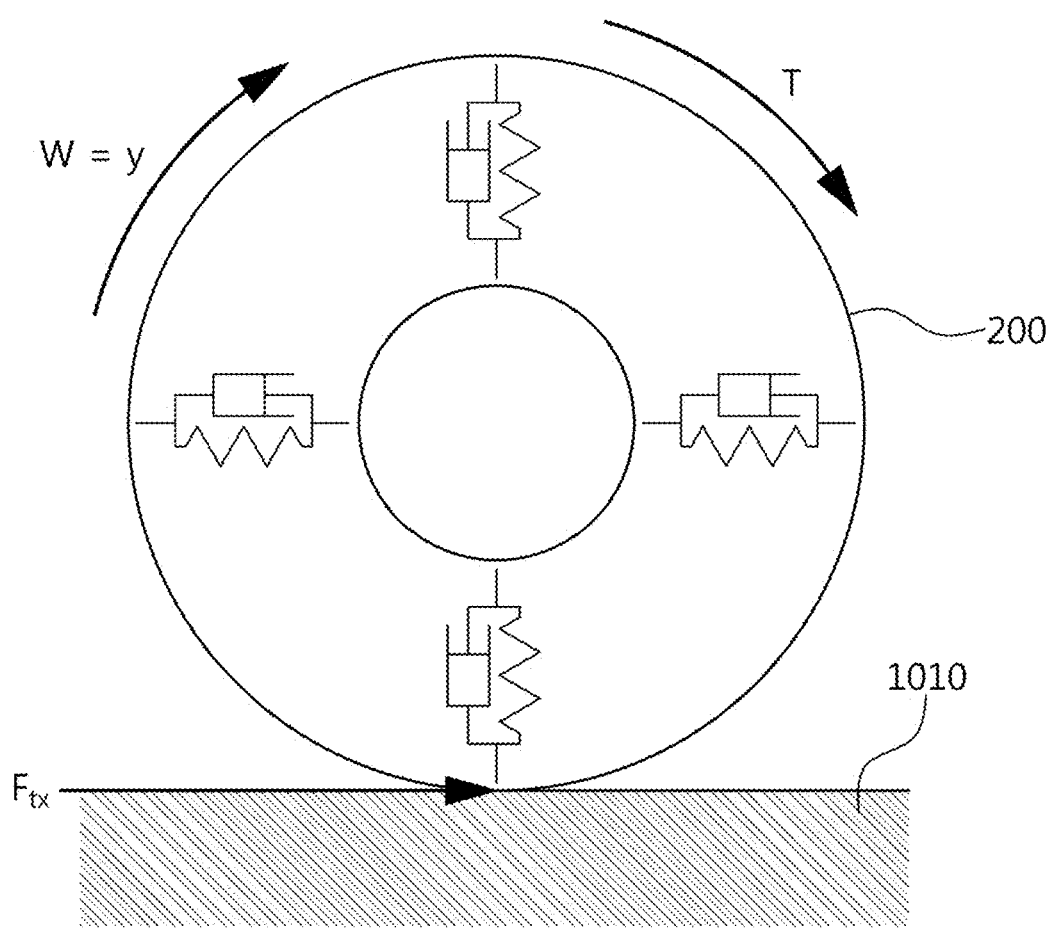
FIG. 10 is a conceptual view for explaining calculation of the tire resonance frequency illustrated in FIG. 4.

FIG. 10 is a conceptual view for explaining the calculation of the tire resonance frequency illustrated in FIG. 4. Referring to FIG. 10, the vehicle wheel 200 travels on the ground 1010 by the rotational motion thereof. The rotational motion may be expressed by the following equation:

$$J_w \times \ddot{y} = T - r \times F_{tx} - b \times \dot{y} - k \times y \quad \text{[Equation 12]}$$

where y=wheel rotation angle, ÿ=wheel rotation acceleration, T=wheel drive torque, $F_{tx}$=longitudinal tire force, r=tire radius, b=tire damping, k=tire stiffness, and $J_w$=tire inertia.

The wheel rotational motion equation may be expressed as a secondary transfer function indicated by the following equation:

$$\frac{Y(s)}{U(s)} = \frac{1}{J_w \times s^2 + b \times s + k} \quad \text{[Equation 13]}$$

where $Y(s)$ is an output function, $U(s)$ is an input function, and $s$ is a resonanance frequency.

Since it is aimed at only estimating the tire resonance frequency, the discretization and simplification of the above equation are performed using an auto-regressive model. This is expressed by the following equation:

$$\frac{Y(z)}{E(z)} = \frac{1}{1 + \theta_1 \times z^{-1} + \theta_2 \times z^{-2}} = H(z, \theta) \quad \text{[Equation 14]}$$

where $\theta$ is an estimated parameter, $\theta = [\theta_1 \; \theta_2]^T$, $T$ is a transposed matrix, and $H$ is a transfer function.

Applying the above equation to a recursive least square (RLS) technique is as follows:

$$\begin{aligned} y(t) &= -y(t-1) \times \theta_1 - y(t-2) \times \theta_2 + e(t) \\ &= [-y(t-1)_1 - y(t-2)] \times [\theta_1 \; \theta_2]^T + e(t) \\ &= \phi(t)^T \times \theta + e(t) \end{aligned} \quad \text{[Equation 15]}$$

where $e(t)$ refers to an estimated error.

Meanwhile, the loss function $V(\theta)$ is defined as the following equation:

$$V(\theta) = \sum_{k=1}^{t} \lambda^{t-k} \times \{y(k) - \phi(k)^T \times \theta\}^2 \quad \text{[Equation 16]}$$

where $\lambda$ = forgetting factor.

In addition, the LRS-based parameter estimation may be defined as the following equation:

$$\hat{\theta}(t) = \hat{\theta}(t-1) + K(t) \times \{y(t) - \phi(t)^T \times \hat{\theta}(t-1)\} \quad \text{[Equation 17]}$$

where K(t)=RLS gain.

Therefore, the estimation of the tire resonance frequency may be expressed by the following equation:

$$\text{tire resonance frequency} = \arccos\left(\frac{\hat{\theta}_1}{2\sqrt{\hat{\theta}_2}}\right) \times \frac{1}{2\pi \times T_s} \quad \text{[Equation 18]}$$

where $T_s$ = sampling time.

Figure 11A:
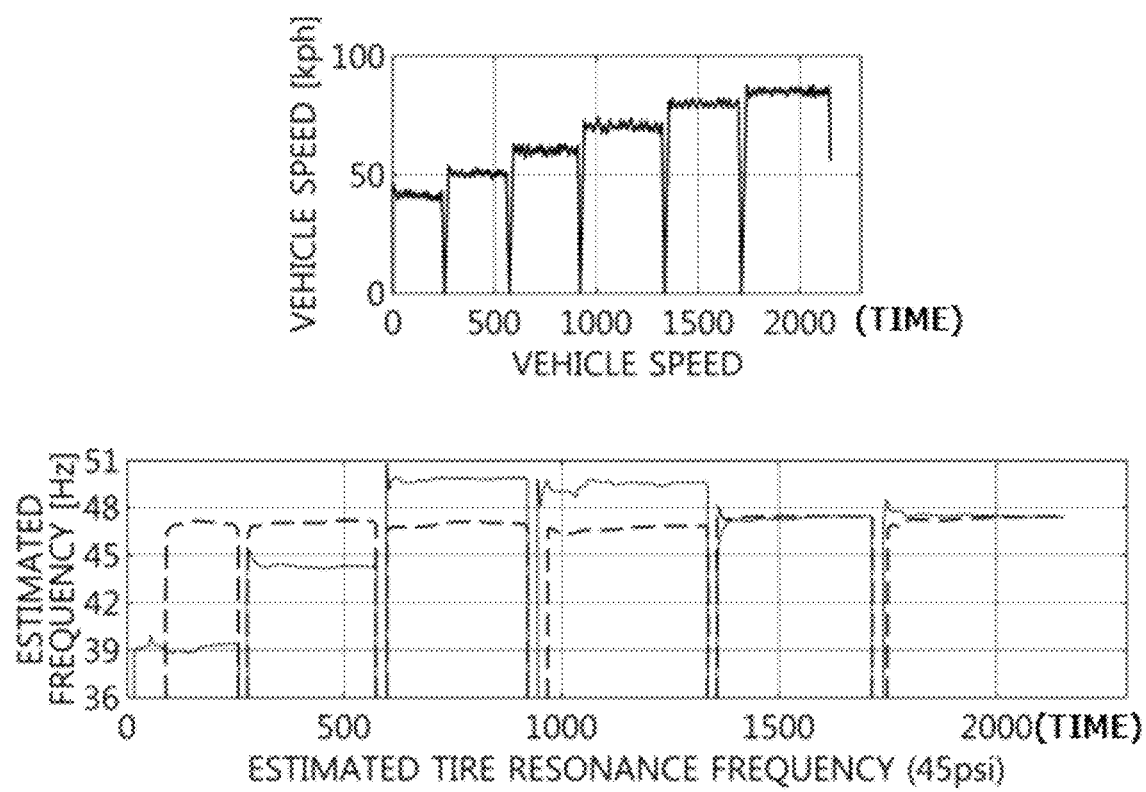
FIGS. 11A to 11C illustrate an estimated frequency according to the tire pressure in one form of the present disclosure.
Figure 11B:
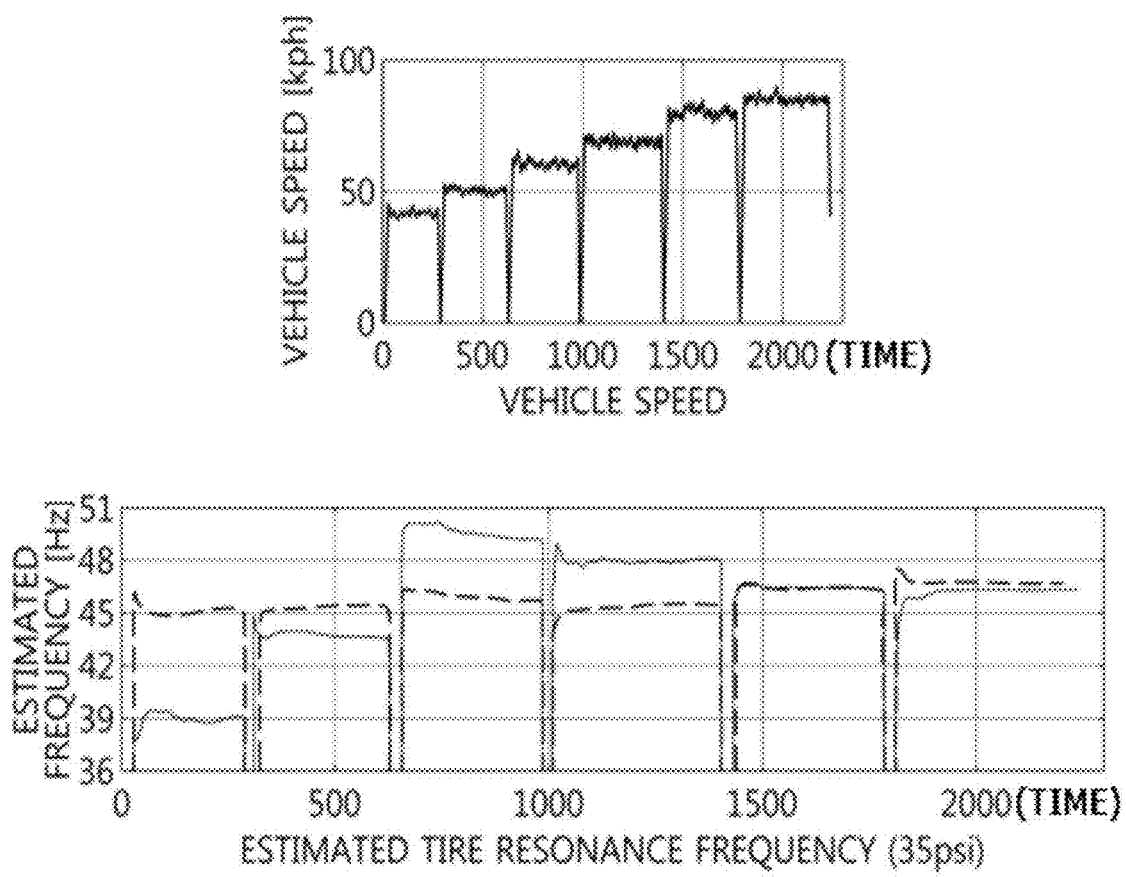
Figure 11C:
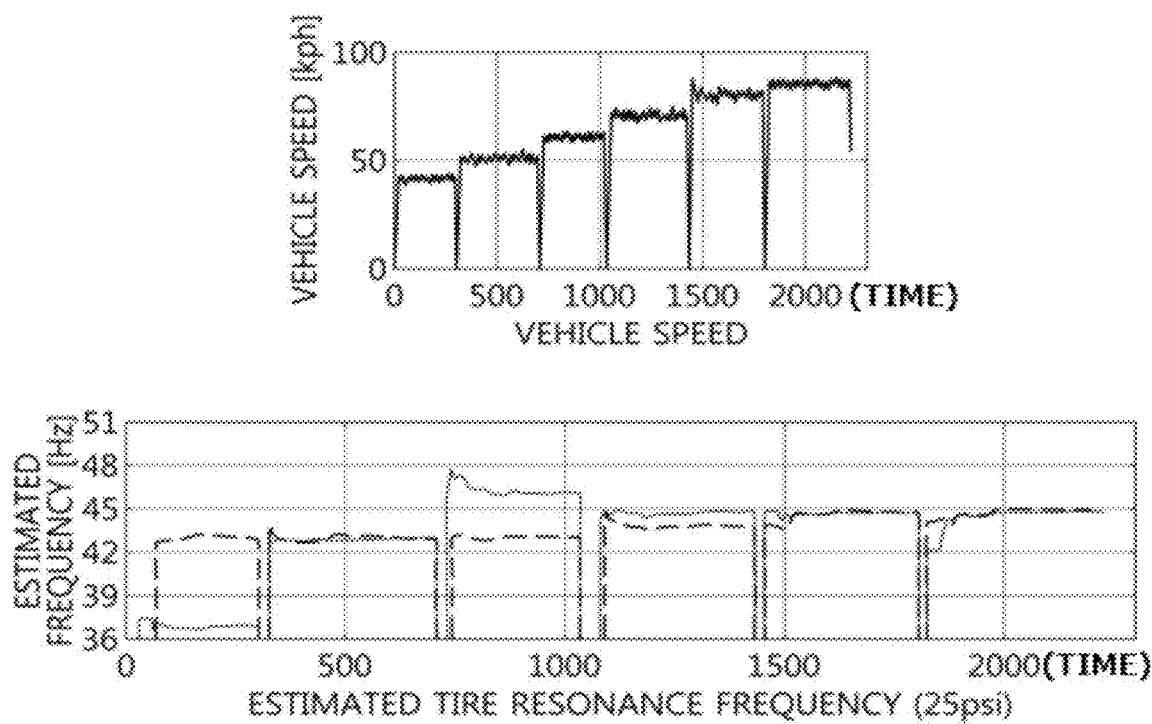

FIGS. 11A to 11C illustrate an estimated frequency according to the tire pressure in some forms of the present disclosure. FIGS. 11A to 11C illustrate a traveling speed and an estimated tire resonance frequency according to the tire pressures of 45 psi, 35 psi, and 25 psi. Here, "psi" refers to a pound per square inch.

In particular, as illustrated in FIGS. 11A to 11C, it can be seen that the variation of the estimated resonance frequency is large when the notch filter in some forms of the present disclosure is not used and when it is used.

Figure 12:
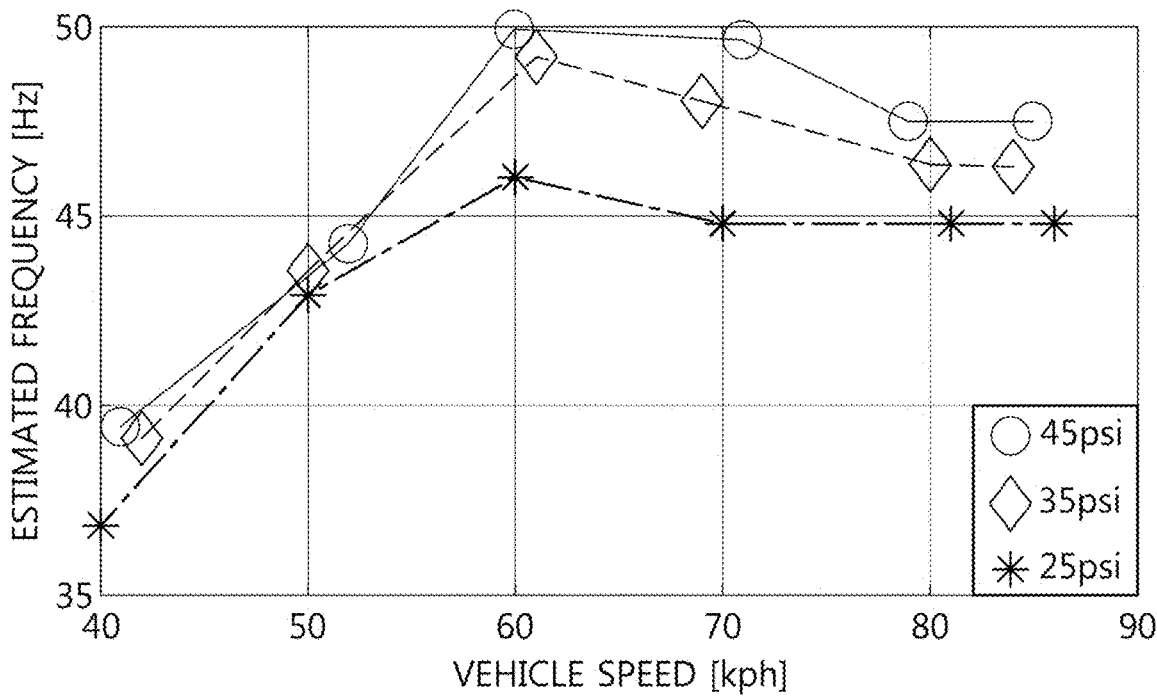
FIG. 12 is a graph illustrating a state in which no engine noise is typically removed.

FIG. 12 is a graph illustrating a state in which no engine noise is typically removed. FIG. 12 illustrates an estimated resonance frequency when the engine noise removal technique is not used.

Figure 13:
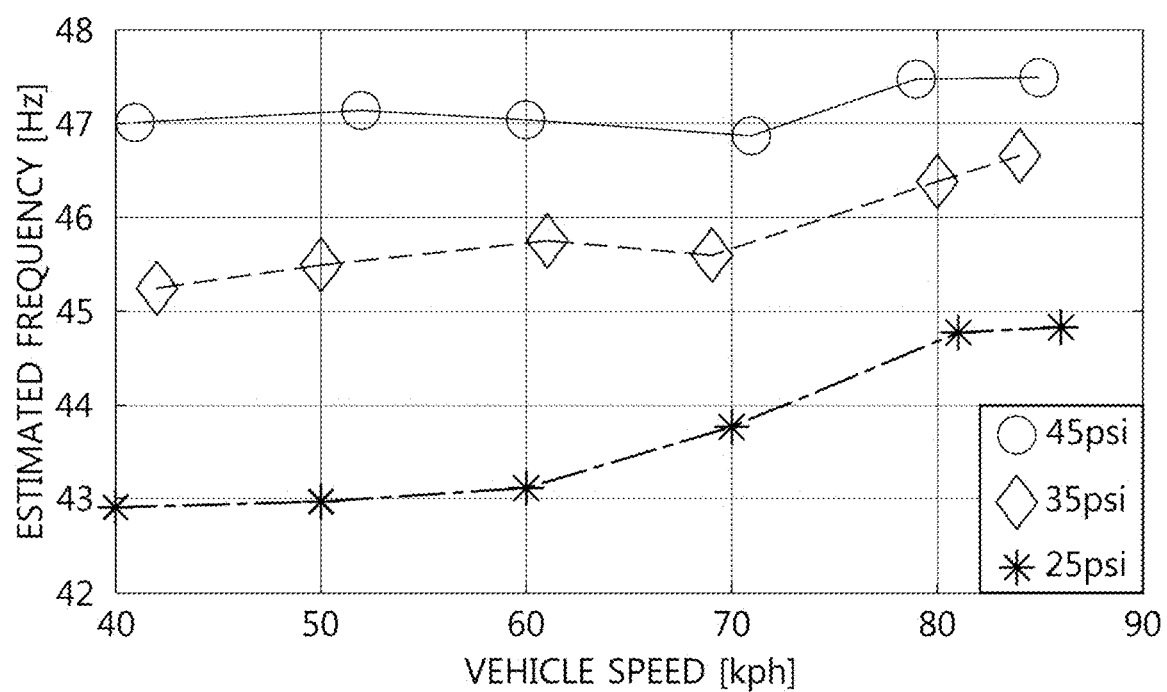
FIG. 13 is a graph illustrating a state in which engine noise is removed in one form of the present disclosure.

FIG. 13 is a graph illustrating a state in which engine noise is removed in some forms of the present disclosure. FIG. 13 illustrates an estimated resonance frequency when the engine noise removal technique is used. Referring to FIG. 13, it is possible to estimate the tire resonance frequency, which is robust to the variation of the traveling speed, by the engine noise removal technique in some forms of the present disclosure. In addition, it is possible to secure the low-pressure detection performance of the tire which is robust to the variation of the traveling speed.

In some forms of the present disclosure, it is possible to estimate the resonance frequency of the tire which is robust to the vehicle speed and/or the engine RPM.

In addition, it is possible to secure the low-pressure detection performance of the tire by estimating the tire resonance frequency of the tire even in the low-speed region.

The steps of the method or algorithm described in some forms of the disclosure may be implemented in the form of program commands executable by various computer means and recorded in a computer readable medium. The computer readable medium may include a program (command) cord, a data file, a data structure, or the like alone or in combination.

The program (command) cord recorded on the medium may be specially designed and configured for some forms of the present disclosure, or may be known to those skilled in the computer software for use. Examples of the computer readable medium may include magnetic media such as hard disks, floppy disks, or magnetic tapes, optical media such as CD-ROMs, DVDs, Blu-ray, and semiconductor memory devices, such as ROMs, RAMs, or flash memories, which are specifically configured to store and perform a program (command) cord.

Here, examples of the program (command) cord include a machine language code prepared by a compiler and a high-class language code executable by a computer using an interpreter, or the like. The hardware devices described above may be configured to operate as one or more software modules to perform the operation of some forms of the present disclosure, and vice versa.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An apparatus for estimating a tire resonance frequency, the apparatus comprising:

a sensor configured to detect a rotation of a tone wheel; and a signal processor configured to:
- generate a corrected wheel speed by calculating the detected rotation;
- generate a filtered wheel speed from which an engine noise is removed by filtering the corrected wheel speed in a predetermined manner; and
- estimate the tire resonance frequency using the filtered wheel speed.

2. The apparatus of claim 1, wherein the signal processor is configured to:
filter the corrected wheel speed using a notch filter, wherein the notch filter is designed based on an engine frequency calculated from an engine revolution per minute (RPM).

3. The apparatus of claim 2, wherein the signal processor is configured to:
filter the corrected wheel speed by applying different predetermined weighted values to a band-pass filter and the notch filter.

4. The apparatus of claim 3, wherein the band-pass filter has a predetermined radial vibration range of the tire.

5. The apparatus of claim 1, wherein the apparatus further comprises:
a gyro sensor configured to measure a longitudinal acceleration, a lateral acceleration, and a yaw rate of the vehicle.

6. The apparatus of claim 4, wherein the signal processor is configured to not estimate the tire resonance frequency when:
- the measured longitudinal acceleration or the measured lateral acceleration is greater than a predetermined first set value, or
- the measured yaw rate is greater than a predetermined second set value.

7. The apparatus of claim 1, wherein the signal processor is configured to:
not estimate the tire resonance frequency when position control information related to operating body position control of the vehicle is received.

8. The apparatus of claim 1, wherein the signal processor is configured to:
not estimate the tire resonance frequency when a vehicle speed is less than a predetermined third set value or greater than a predetermined fourth set value.

9. The apparatus of claim 1, wherein the signal processor is configured to:
generate the corrected wheel speed by correcting a tone wheel angle and a tone wheel error angle and applying an average tone wheel error that is caused by using an average filter for each pulse counter of each tone wheel.

10. The apparatus of claim 1, wherein the signal processor is configured to:
calculate the tire resonance frequency by performing discretization and simplification using an auto-regressive model.

11. A method of estimating a tire resonance frequency, the method comprising:
detecting, by a sensor, a rotation of a tone wheel;
generating, by a signal processor, a corrected wheel speed by calculating the detected rotation;
generating, by the signal processor, a filtered wheel speed from which an engine noise is removed by filtering the corrected wheel speed in a predetermined manner ; and
estimating, by the signal processor, the tire resonance frequency using the filtered wheel speed.

12. The method of claim 11, wherein generating the filtered wheel speed comprises:
filtering, by the signal processor, the corrected wheel speed using a notch filter that is designed based on an engine frequency calculated from an engine revolution per minute (RPM).

13. The method of claim 12, wherein generating the filtered wheel speed comprises:
filtering, by the signal processor, the corrected wheel speed by applying different predetermined weighted values to a band-pass filter and the notch filter.

14. The method of claim 13, wherein the band-pass filter has a predetermined radial vibration range of the tire.

15. The method of claim 11, wherein the method comprises:
measuring, by a gyro sensor, a longitudinal acceleration, a lateral acceleration, and a yaw rate of a vehicle.

16. The method of claim 14, wherein estimating the tire resonance frequency comprises:
not estimating, by the signal processor, the tire resonance frequency when the measured longitudinal acceleration or the measured the lateral acceleration measured is greater than a predetermined first set value or the measured yaw rate is greater than a predetermined second set value.

17. The method of claim 11, wherein estimating the tire resonance frequency comprises:
not estimating, by the signal processor, the tire resonance frequency when the position control information related to operating body position control of a vehicle is received.

18. The method of claim 11, wherein estimating the tire resonance frequency comprises:
not estimating, by the signal processor, the tire resonance frequency when a vehicle speed is less than a predetermined third set value or greater than a predetermined fourth set value.

19. The method of claim 11, wherein generating the corrected wheel speed comprises:
generating, by the signal processor, the corrected wheel speed by correcting a tone wheel angle and a tone wheel error angle and applying an average tone wheel error that is caused by using an average filter for each pulse counter of each tone wheel.

20. The method of claim 11, wherein the method comprises:
calculating, by the signal processor, the tire resonance frequency by performing discretization and simplification using an auto-regressive model.

* * * * *